March 30, 1926.

Z. F. HARSHTON

BELT

Filed Nov. 16, 1922

1,578,727

INVENTOR
Z. F. Harshton
BY
Munn & Co.
ATTORNEYS

Patented Mar. 30, 1926.

1,578,727

UNITED STATES PATENT OFFICE.

ZELL FULTON HARSHTON, OF CHICAGO, ILLINOIS.

BELT.

Application filed November 16, 1922. Serial No. 601,300.

*To all whom it may concern:*

Be it known that I, ZELL FULTON HARSH-TON, a citizen of the United States, and a resident of Chicago, in the county of Cook and State of Illinois, have invented a new and useful Improvement in Belts, of which the following is a full, clear, and exact description.

My invention relates to improvements in belts, and it consists in the combinations, constructions, and arrangements herein described and claimed.

An object of my invention is to provide a heat resisting belt which is adapted to be used as a conveying or elevating belt.

A further object of my invention is to provide a belt in which one ply thereof is made of a heat resisting material.

A further object of my invention is to provide a device of the character described in which the heat resisting ply may be disposed in any position with respect to the belt, and which is permanently secured to the belt so as to form an integral part thereof.

A further object of my invention is to provide a device of the character described which is simple in construction, and which provides an efficient heat resisting medium.

Other objects and advantages will appear in the following specification, and the novel features of the invention will be particularly pointed out in the appended claims.

My invention is illustrated in the accompanying drawings, forming part of this application, in which—

In carrying out my invention, I provide a belt which is composed of the ordinary organic core plies 1 such as rubber or leather, and an inorganic core ply 2 such as asbestos. The ply 2 may be disposed in any position with respect to the other plies of the belt, and is secured to the other plies by a single stitching operation. The ply 2, as heretofore stated, is made of inorganic material which is insulating and which also has a lower tensile strength and less ability to resist abrasion than the organic plies.

Figure 1:
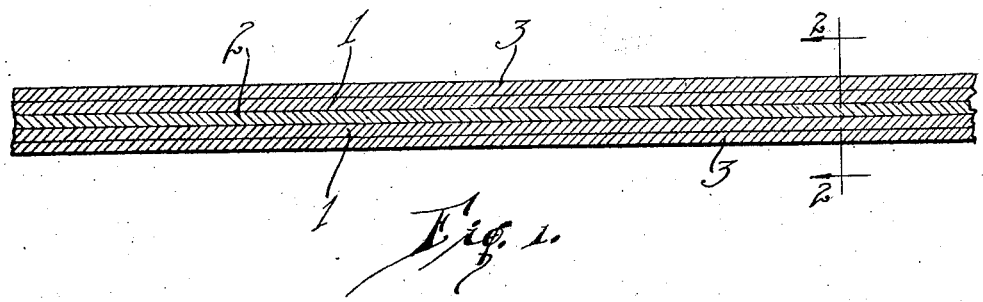
Figure 1 is a longitudinal section through the device.
Figure 2:
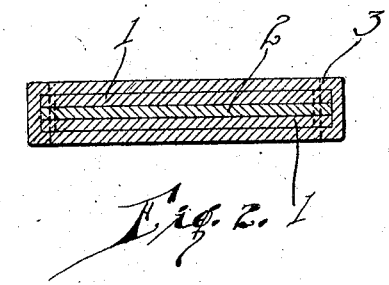
Figure 2 is a section along the line 2—2 of Figure 1.

In Figure 1 I have shown the belt constructed for use as a conveyor belt. In this instance, the ply 2 is secured to the plies 1 by means of stitching, the plies 1 and 2 forming a core for the belt. A cover 3 of organic material such as leather is disposed around the core, as clearly shown in Figure 2 and thus effectually protects the core. In this manner, the ply 2 is protected from undue tensile strain or any abrasive wear thereon. At the same time, however, the ply 2 prevents the belt from becoming over-heated, since it acts as an insulating medium. The belt, when completed, resembles an ordinary belt, except that it has the added advantage of being heat resisting. The play 2 is secured to the belt permanently and cannot be removed therefrom except by tearing the belt apart. It should be clearly understood that the ply 2 is not a separate cover or pad to the belt, but is permanently secured to the belt and cannot be detached therefrom. The ply 2 in reality is an integral part of the belt, except that it differs in composition from the other plies of the belt.

From the foregoing description of the various parts of the device, the operation thereof may be readily understood. By providing the insulating ply 2 to the belt, the belt is made heat resisting, which is a distinct advantage over belts of ordinary construction. The insulating ply is not as strong as the other or organic plies and has to be protected so as not to be subjected to the strain and abrasive action which the other plies are subjected to. It is therefore important that the ply be disposed in the belt so as not to be brought into contact with the parts which engage with the belt. In Figure 1 I have shown the belt as being constructed so that either side thereof may be used in the ordinary manner, the insulating ply being disposed within the belt and being entirely protected from engaging with the articles which contact with the belt. It is obvious that the ply may be disposed in any position other than that shown in Figure 1 and still provide a belt which does not depart from the spirit and scope of my invention. The insulating ply is readily secured to the belt in the same manner as the other plies are secured in place, and the belt can therefore be manufactured just as cheaply when using the insulating ply as when not using the insulating ply. The device is therefore just as simple in construction as is the ordinary belt with the added feature of providing a heat resisting belt.

Figure 3:
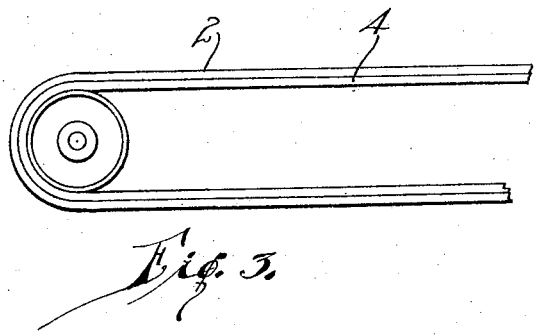
Figure 3 is a modified form of the device.

In Figure 3 I have shown a modified form of the device in which the ply 2 is disposed in a different relation with respect to the other plies. As heretofore stated, the ply 2 may be placed in any position with respect to the belt and will perform the same function. The principal object of the invention is to secure a heat resisting ply to the belt so as to make the entire belt heat resisting. In some cases where the belt is subjected to a strain on both sides thereof, as in the case of a conveyor belt, the ply 2 is entirely protected. In case the belt is to be used as an ordinary belt which connects two pulleys together, the ply 2 may be disposed on the outside of the belt which does not come into contact with the pulleys. In this manner, the ply is not subjected to any undue tensional strain or abrasion, but merely acts as a cover to the ply or plies 4 which are made of organic material and which do the real work of the belt.

Belts constructed in the foregoing manner perform the same function as ordinary belts, and are of the same strength, but have the added feature of being heat resisting. This is a vital improvement in the manufacture of belts. It should be clearly borne in mind that the insulating ply of inorganic material assumes its position with respect to the other plies of the belt so as to provide a belt which is durable for the nature of the service to which it is put. It will therefore be obvious that the ply may be disposed in various positions with respect to the other plies of the belt so as to provide various belts which are adapted for different kinds of work. As heretofore stated, the device is very simple in construction and is inexpensive to manufacture.

The insulating ply may be secured in place by any means other than stitching, such as by cement. I therefore do not wish to be confined to any special manner of securing the insulating plies to the other plies of the belt.

I claim:

1. A belt comprising a central ply of a heat resisting material, a wear resisting ply on each side of said central ply, said heat resisting and said wear resisting plies constituting integral parts of a core, and a cover completely enclosing the core, said cover being of organic material of greater tensile strength and wear resisting properties than said heat resisting ply.

2. A belt comprising a plurality of plies constituting the core of a belt, an insulating ply disposed in said plies so as to be protected thereby, and a cover disposed around said core.

3. A belt comprising a plurality of plies of organic material, an insulating and heat resisting ply of inorganic material disposed between said first named plies, said organic and inorganic plies constituting the core of the belt, and a covering of organic material disposed around said core and being permanently secured thereto.

ZELL FULTON HARSHTON.